(12) United States Patent
Carrick et al.

(10) Patent No.: US 8,732,359 B2
(45) Date of Patent: May 20, 2014

(54) DATA SHARING IN HIGH-FIDELITY SIMULATION AND REAL-TIME MULTI-CORE EXECUTION

(71) Applicant: The MathWorks, Inc., Natick, MA (US)

(72) Inventors: James E. Carrick, Natick, MA (US); Biao Yu, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/708,599

(22) Filed: Dec. 7, 2012

(65) Prior Publication Data

US 2013/0346647 A1 Dec. 26, 2013

Related U.S. Application Data

(60) Provisional application No. 61/567,838, filed on Dec. 7, 2011.

(51) Int. Cl.
*G06F 13/12* (2006.01)
*G06F 15/00* (2006.01)
*G06F 9/30* (2006.01)
*G06F 9/40* (2006.01)

(52) U.S. Cl.
USPC ............... 710/52; 712/9; 712/21; 712/215

(58) Field of Classification Search
USPC ................... 710/52; 712/9, 21, 215
See application file for complete search history.

(56) References Cited

U.S. PATENT DOCUMENTS

2002/0152061 A1* 10/2002 Shimogori et al. ............ 703/21

* cited by examiner

*Primary Examiner* — Farley Abad
(74) *Attorney, Agent, or Firm* — Snyder, Clark, Lesch & Chung, LLP

(57) ABSTRACT

When executing a graphical model of a dynamic system that includes two or more concurrently executing sets of operations, a processor is configured to create a first buffer and a second buffer within the executable graphical model. A first set of operations is configured to write data to the first buffer during a first execution instance of the first set of operations. The first set of operations is configured to write data to the second buffer during a second execution instance of the first thread. A second set of operations is configured to read the data from the first buffer during an instance of the second thread that executes contemporaneously with the second execution instance of the first set of operations. Determinations regarding access to the first buffer and second buffer by the first thread and second thread are self-contained within the first thread and second thread, respectively.

31 Claims, 7 Drawing Sheets

DATA SHARING IN HIGH-FIDELITY SIMULATION AND REAL-TIME MULTI-CORE EXECUTION

CROSS-REFERENCE TO RELATED APPLICATION

This application claims priority under 35. U.S.C. §119, based on U.S. Provisional Patent Application No. 61/567,838 filed Dec. 7, 2011, the disclosure of which is hereby incorporated by reference herein.

BACKGROUND

A large variety of systems, such as mechanical systems, electrical systems, biological systems, and/or computer systems, may be represented as dynamic systems. Computational tools have been developed to model, simulate, and/or analyze dynamic systems. A computational tool may represent a dynamic system using a graphical model. The graphical model may include blocks that may represent components of the dynamic system. The blocks may be connected to represent relationships between the components. The computational tool may simulate the graphical model and may provide results of the simulation. One class of dynamic systems includes multi-core embedded computer systems in which sets of operations (e.g., threads, processes, etc.) may execute concurrently and utilize processing capabilities on multiple processing cores. A graphical model may be used to simulate the execution of such systems. However, developing a model for simulating multi-core systems may be challenging.

More specifically, efficient use of real-time multi-core embedded systems implies maximally concurrent execution of the two or more periodic threads of execution that make up an application. A common scenario is for the periodic threads to have an integral timing relationship (N, 2N, . . . 5N, etc.) where N is some base rate period, additionally being driven from a common timing source. Communication between these threads necessitates one of several approaches to ensure robust data sharing.

However, there are several drawbacks with conventional techniques of performing simulations of multicore, concurrent thread execution, such as the introduction of serialization of thread execution (in contrast to true concurrency), reducing hardware utilization and execution performance, and difficulties in capturing the temporal behavior of a real-time application in a modeled 'offline' simulation of the application. These difficulties lead to lower-fidelity simulations and thread synchronization for implementing the data sharing.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION OF EMBODIMENTS

Figure 1:
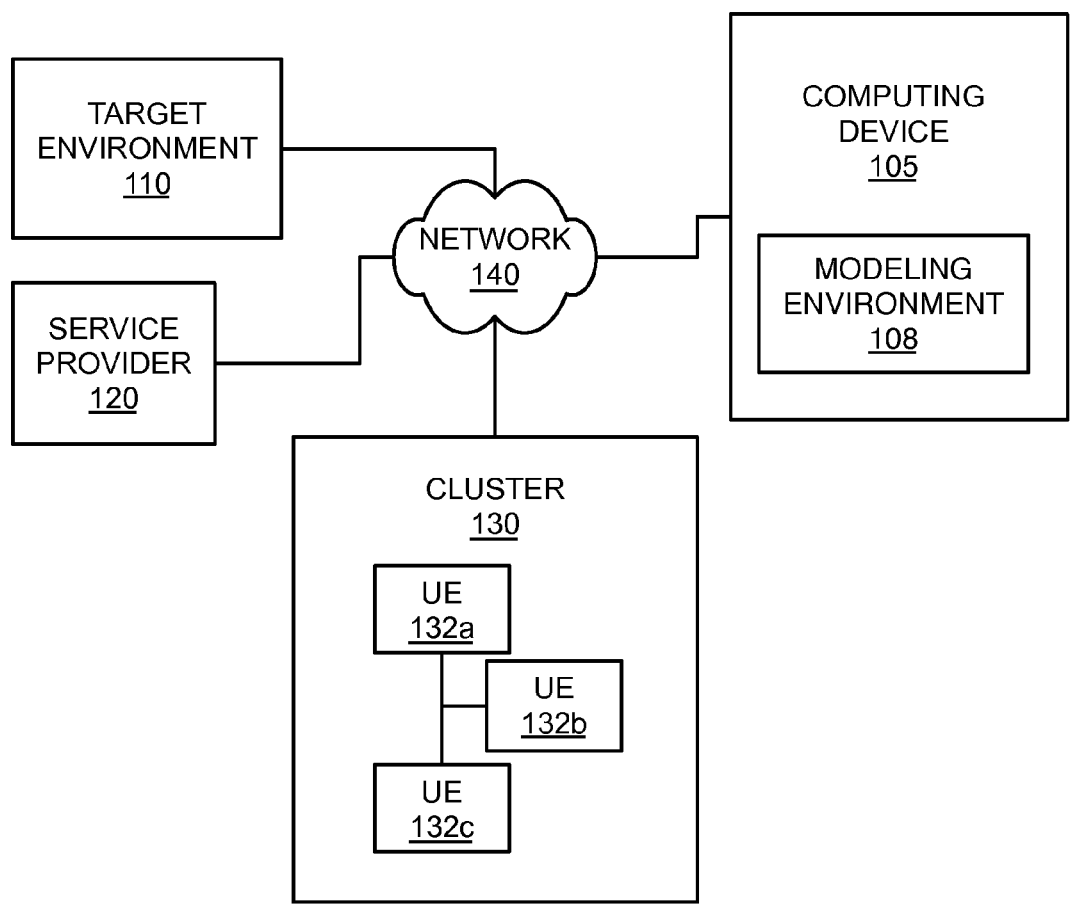
FIG. 1 illustrates an exemplary environment that may be configured to implement one or more embodiments described herein.

The following detailed description refers to the accompanying drawings. The same reference numbers in different drawings identify the same or similar elements. Also, the following detailed description does not limit the invention.

Consistent with implementations described herein, an approach is provided for data sharing in a multi-core application with periodically (and concurrently) executing sets of operation (e.g., threads, processes, etc.), referred to hereinafter as "threads" for simplicity. For the following description, consider a real-time application with multiple periodic threads of execution having a 0.1, 0.2 and 0.3 second interval in which execution of the threads is fully concurrent. This scenario is conceptually illustrated in Table 1.

TABLE 1

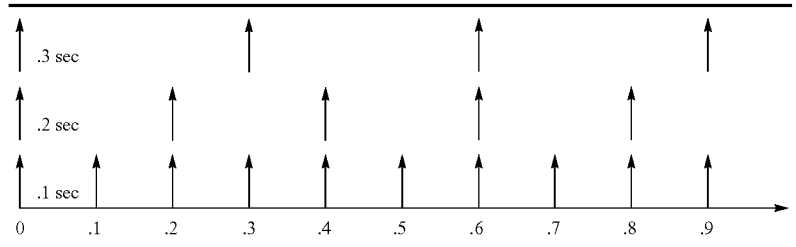

For a real-time system with three or more cores, these threads of execution can run concurrently on the processor cores, immediately starting when their periodic trigger occurs, given that there is no data coupling (e.g., dependencies, etc.) between them. However, if data is shared between threads, then depending on the data sharing algorithm chosen, coupling between threads can be introduced. For example, the data sharing algorithm may require a thread to wait for data from another thread before continuing (i.e. synchronizing).

Such data coupling can have side effects on the timing of input/output (I/O) access to external hardware devices for a thread. For example, using the example of Table 1, if the 0.2 second thread is waiting for data from the 0.1 second thread, then it could also delay an output, such as a digital to analog conversion output, occurring in the 0.2 second thread (as it waits for completion of the 0.1 second thread). This potential for I/O delay may introduce jitter into the real-time interactions occurring from the application to connected mechanical devices (e.g., plant, etc.). In addition, the jitter may be propagated to downstream components and can be accumulated in the system control path.

In simulations of these multicore systems, such jitter is not typically modeled during an 'off-line' simulation of the application algorithm since it requires the simulation to accurately account for the non-zero execution time of the algorithmic threads on the real-time system. Thus, allowing execution data coupling between threads due to data sharing reduces the effectiveness of 'off-line' simulations in helping determine stability margins for the algorithm design. This is a significant limitation, reducing the effectiveness of a model based design workflow that is premised on the ability to accurately simulate a design before deploying it in a real-time system.

Finally, many forms of synchronizing the data sharing between threads require using operating system APIs (semaphores, mutexes, etc.), which imply calls into the operating system (OS) kernel. These kernel calls can be significantly more expensive in terms of CPU instruction overhead than simpler data sharing approaches such as using an atomic control flag variable in the code.

Exemplary Environment

FIG. 1 illustrates an exemplary environment 100 that may be configured to implement one or more embodiments described herein. Referring to FIG. 1, environment 100 may contain computing device 105, target environment 110, service provider 120, processing cluster 130, and network 140. Note that the distributed environment illustrated in FIG. 1 is just one example of an environment that may be used with embodiments of the invention. Other distributed environments that may be used with embodiments of the invention may contain more entities, fewer entities, entities in arrangements that differ from the arrangement illustrated in FIG. 1. In addition, standalone environments can be used for implementing embodiments of the invention without departing from the spirit of the invention.

Details of computing device 105 are described below with respect to FIG. 2. In distributed environment 100, computing device 105 may be configured to, among other things, exchange information (e.g., data) with other entities (e.g., target environment 110, service provider 120, and cluster 130) in network 140. Computing device 105 may interface with network 140 via communication interface 280.

Network 140 may include a communication network capable of exchanging information between the entities in network 140. The network 140 may include digital and/or analog aspects. The information may include machine-readable information having a format that may be adapted for use, for example, in the network 140 and/or with one or more entities in network 140. For example, the information may be encapsulated in one or more packets that may be used to transfer the information through network 140.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

Network 140 may comprise various network devices, such as gateways, routers, switches, firewalls, servers, repeaters, address translators, etc. Portions of network 140 may be wired (e.g., using wired conductors, optical fibers, etc.) and/or wireless (e.g., using free-space optical (FSO), radio frequency (RF), acoustic transmission paths, etc.). Portions of network 140 may include a substantially open public network, such as the Internet. Portions of network 140 may include a more restricted network, such as a private corporate network or virtual private network (VPN). It should be noted that implementations of networks and/or devices operating on networks described herein are not limited with regards to information carried by the networks, protocols used in the networks, the architecture/configuration of the networks, etc.

Service provider 120 may include logic (e.g., software) that makes a service available to another entity in distributed environment 100. Service provider 120 may also include a server operated by, for example, an individual, a corporation, an educational institution, a government agency, and so on, that provides one or more services to a destination, such as computing device 105. The services may include software containing computer-executable instructions that implement one or more embodiments of the invention or portions thereof, and may be executed, in whole or in part, by (1) a destination, (2) service provider 120 on behalf of the destination, or (3) some combination thereof.

For example, in an embodiment, service provider 120 may provide one or more subscription-based services that may be available to various customers. The services may be accessed by a customer via network 140. The customer may access the services using a computing device, such as computing device 105. The services may include services that implement one or more embodiments of the invention or portions thereof. Service provider 120 may limit access to certain services based on, e.g., a customer service agreement between the customer and service provider 120.

The service agreement may allow the customer to access the services that may allow the customer to build, execute, and/or analyze a model. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Processing cluster 130 may include a number of units of execution (UEs) 132 that may perform processing of one or more embodiments of the invention or portions thereof on behalf of computing device 105 and/or another entity, such as service provider 120. UEs 132 may reside on a single device or chip or on multiple devices or chips. For example, UEs 132 may be implemented in a single ASIC or in multiple ASICs. Likewise, UEs 132 may be implemented in a single computing device or multiple computing devices. Other examples of UEs 132 may include FPGAs, CPLDs, ASIPs, processors, multiprocessor systems-on-chip (MPSoCs), graphic processing units, microprocessors, etc.

UEs 132 may be configured to perform operations on behalf of another entity. For example, in an embodiment, UEs 132 are configured to execute portions of code associated with modeling environment 108. Here, modeling environment 108 may dispatch certain activities pertaining to one or more embodiments of the invention to UEs 132 for execution. Service provider 120 may configure cluster 130 to provide, for example, the above-described services to computing device 105 on a subscription basis (e.g., via a web service).

Figure 2:
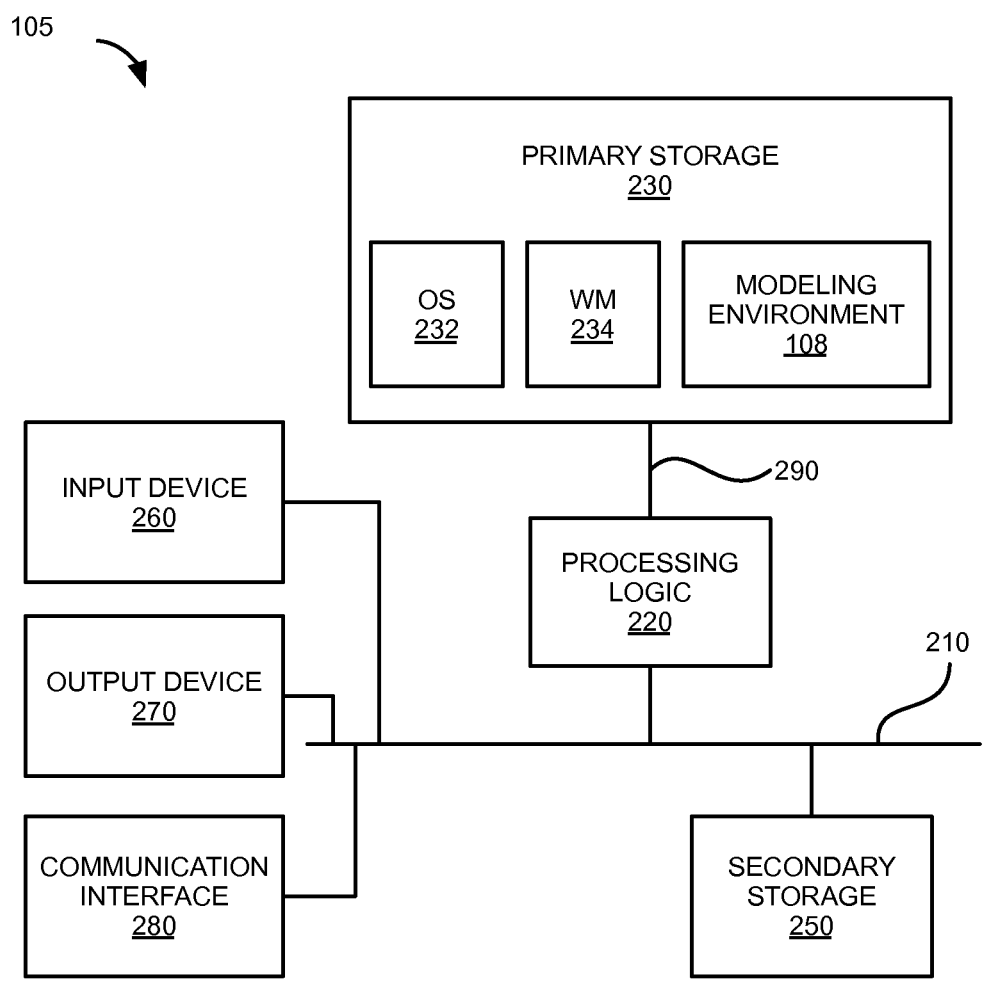
FIG. 2 illustrates an example of a computing device that may be configured to implement one or more embodiments of the invention.

FIG. 2 illustrates an example of a computing device 105 that may be configured to implement one or more embodiments of the invention. Referring to FIG. 2, computing device 105 may be associated with (e.g., include) one or more components including an input-output (I/O) bus 210, processing logic 220, a primary storage 230, a secondary storage 250, an input device 260, an output device 270, a communication interface 280, and a memory bus 490. Note that computing device 105 is an example of a computing device that may be configured to implement one or more embodiments described herein. It should be noted that other computing devices that may be less complicated or more complicated than computing device 105 may be configured to implement one or more embodiments of the invention.

I/O bus 210 may be an interconnect bus configured to enable communication among various components in computing device 105, such as processing logic 220, secondary storage 250, input device 260, output device 270, and communication interface 280. The communication may include, among other things, transferring information (e.g., data and control information) between the components.

Memory bus 290 may be an interconnect bus configured to enable information to be transferred between processing logic 220 and primary storage 230. The information may include instructions and/or data that may be executed, manipulated, and/or otherwise processed by processing logic 220. The instructions and/or data may include instructions and/or data that are configured to implement one or more embodiments described herein.

Processing logic 220 may include logic configured to interpret, execute, and/or otherwise process information contained in, for example, primary storage 230 and/or secondary storage 250. The information may include instructions and/or data configured to implement one or more embodiments described herein. Processing logic 220 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. Processing logic 220 may comprise a single core or multiple cores. An example of a processor that may be used to implement processing logic 220 is the Intel® Xeon® processor available from Intel Corporation, Santa Clara, Calif.

Secondary storage 250 may be a computer-readable media that is accessible to the processing logic 220 via I/O bus 210. Secondary storage 250 may be configured to store information for processing logic 220. The information may be executed, interpreted, manipulated, and/or otherwise processed by processing logic 220. Secondary storage 250 may comprise, for example, a storage device, such as a magnetic disk, optical disk, random-access memory (RAM) disk, flash drive, etc. The information may be stored on one or more computer-readable media contained in the storage device. Examples of media that may be contained in the storage device may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

Input device 260 may include one or more mechanisms that permit a user to input information into computing device 105, such as a keyboard, keypad, or control buttons, a microphone, a remote control, a touch-screen display, a camera or video camera, a computer mouse, trackball, gyroscopic device (e.g., gyroscope), mini-mouse, stylus, graphics tablet, joystick (isotonic or isometric), pointing stick, accelerometer, palm mouse, foot mouse, puck, eyeball controlled device, finger mouse, light pen, light gun, eye tracking device, steering wheel, yoke, jog dial, space ball, directional pad, dance pad, soap mouse, haptic device, tactile device, and discrete pointing device. For example, input device 260 may be a computer mouse that includes switches or buttons that may enable a user to point, click, and drag items in a display. Movements of the pointing device may be echoed on the display by movements of a cursor and/or other visual changes.

Output device 270 may include one or more mechanisms that may output information from computing device 105. Output device 270 may include logic that may be directed by, for example, processing logic 220, to output the information from computing device 105. The information may be presented in the form of a display that may be displayed by output device 270. The information may include, for example, graphical user interface (GUI) elements (e.g., windows, widgets, etc.), a graphical block diagram of a model, text, or other information. Output device 270 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, multi-dimensional display device, or other output device.

Communication interface 280 may include logic configured to interface computing device 105 with, for example, a communication network and enable computing device 105 to communicate with entities connected to the network. An example of a network that may be used with computing device 105 is described further above with respect to FIG. 1.

Communication interface 280 may include a transceiver-like mechanism that enables computing device 105 to communicate with the entities connected to the network. Communication interface 280 may be implemented as a built-in network adapter, network interface card (NIC), Personal Computer Memory Card International Association (PCM-CIA) network card, card bus network adapter, wireless network adapter, Universal Serial Bus (USB) network adapter, modem or other device suitable for interfacing computing device 105 to the network.

Primary storage 230 is accessible to processing logic 220 via memory bus 290. Primary storage 230 may comprise one or more computer-readable media configured to store information for processing logic 220. The information may include computer-executable instructions and/or data that are configured to implement operating system (OS) 232, windows manager (WM) 234, and modeling environment 108. The instructions may be executed, interpreted, and/or otherwise processed by processing logic 220.

Primary storage 230 may comprise a RAM that may include RAM devices configured to store information (e.g., data, executable instructions). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 232 may be a conventional operating system that may be configured to implement various conventional operating system functions. These functions may include, for example, scheduling one or more portions of modeling environment 108 to run on processing logic 220, managing primary storage 230, controlling access to various components associated with computing device 105 (e.g., input device 260, output device 270, communication interface 280, secondary storage 250), and controlling access to data received/transmitted by these components. Examples of operating systems that may be adapted to implement OS 232 include the Linux operating system, Microsoft Windows operating system, the Symbian™ operating system, and the Android™ operating system. A version of the Linux operating system that may be used is Red Hat Linux available from Red Hat Corporation, Raleigh, N.C. Versions of the Microsoft Windows® operating system that may be used include the Microsoft Windows Vista and Microsoft Windows XP operating systems available from Microsoft Inc., Redmond, Wash.

WM 234 may be a conventional window manager that enables graphical user interface (GUI) elements, such as widgets, to be managed in a display that may be displayed by output device 270. WM 234 may also be configured to (1) capture one or more positions of input device 260 and/or other data associated with input device 260, and (2) provide the positions and/or data to OS 232 and/or modeling environment 108. The positions and/or data may be provided, for example, in messages that are sent to OS 232 and/or modeling environment 108. Examples of window managers that may be used with one or more embodiments of the invention include, but are not limited to, the X windows manager (e.g., GNOME, KDE), which is often used with the Linux operating system, and window managers used with the Microsoft XP and Vista operating systems. It should be noted that other window managers or components that are configured to implement various functions associated with window managers may be used with one or more embodiments of the invention.

Modeling environment 108 may be executed as a standalone application or as a plug-in or component of another application, such as a graphical modeling environment, textual modeling environment, or other data processing environment that may be configured to implement one or more embodiments of the invention. Some or all of modeling environment 108 may operate under the control of OS 232.

It should be noted that one or more embodiments of the invention may be implemented in environments other than a modeling environment (e.g., modeling environment 108). For example, one or more embodiments of the invention may be implemented in an operating system, such as OS 232, a window manager, such as WM 234, an application (e.g., Excel), a driver, and so on. Moreover, one or more embodiments of the invention may be adapted to operate in environments that may be multidimensional (e.g., 2-D, 3-D, etc.).

Figure 3:
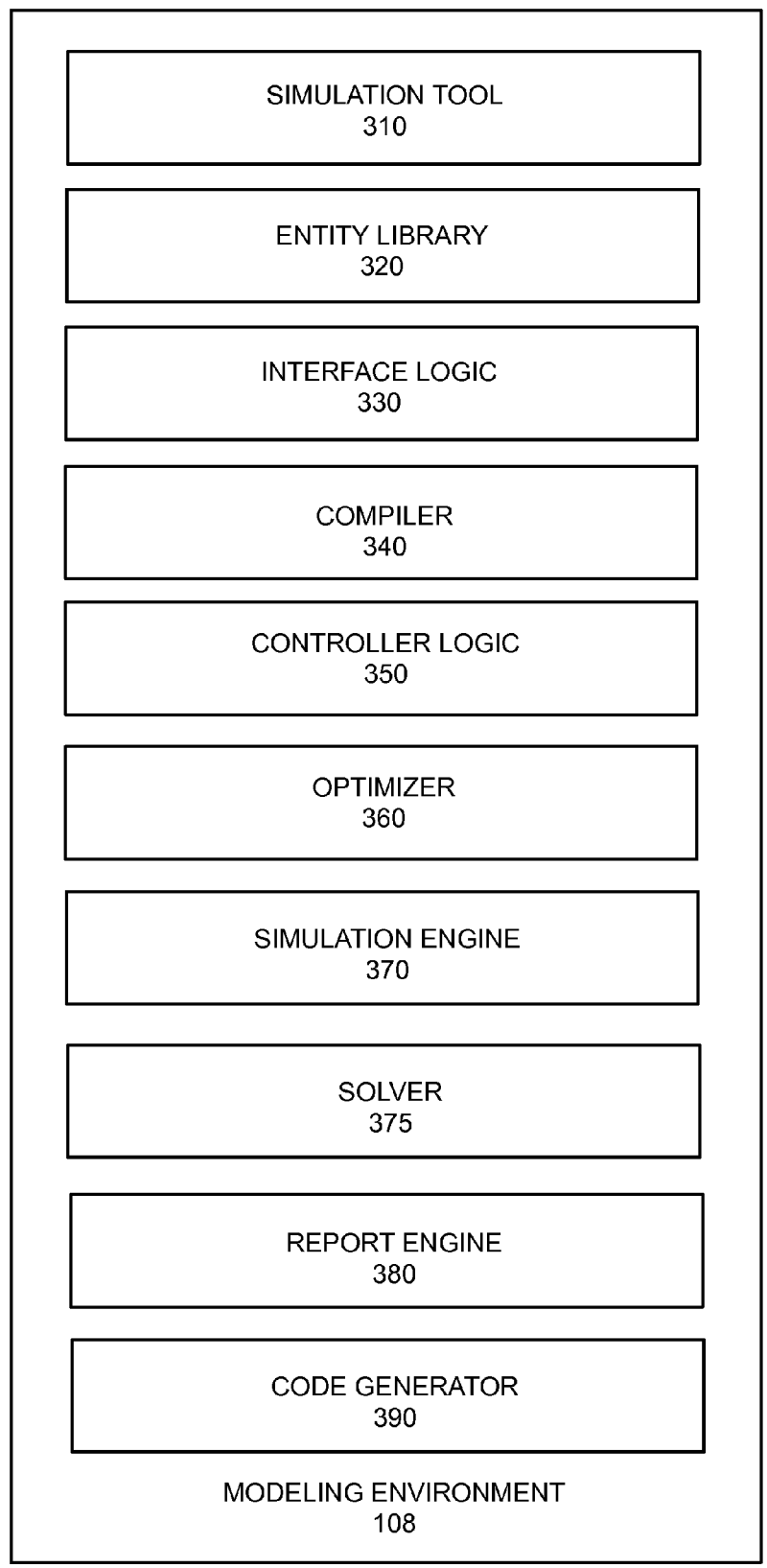
FIG. 3 is a diagram of exemplary components of modeling environment that may be included in the computer device of FIG. 1.

FIG. 3 is a diagram of exemplary components of modeling environment 108 that may be included in computer device 105. Modeling environment 108 may include a development tool that enables existing software components to be used in the creation of a model and that may enable generation of executable code based on the model. For example, the development tool may include a graphical modeling tool or application that provides a user interface for a numerical computing environment. Additionally, or alternatively, the development tool may include a graphical modeling tool and/or application that provides a user interface for modeling and executing a dynamic system (e.g., based on differential equations, difference equations, algebraic equations, discrete events, discrete states, stochastic relations, etc.). Simulink® from The MathWorks, Inc. of Natick, Mass., is an example of a graphical modeling environment 108

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model. A subsystem may be a masked subsystem that is configured to have a logical workspace that contains variables only readable and writeable by elements contained by the subsystem.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may consist of determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally consistent signal flow between blocks, in other implementations, the interactions between blocks may not necessarily be directionally specific or consistent.

In an embodiment, connector lines in a model may represent related variables that are shared between two connected blocks. The variables may be related such that their combination may represent power. For example, connector lines may represent voltage, and current, power, etc. Additionally, or alternatively, the signal flow between blocks may be automatically derived.

In some implementations, one or more of blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Modeling environment 108 may implement a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dassault Systemes.

An alternative embodiment may implement a TCE in a graphically-based TCE using products such as, but not limited to, Simulink®, Stateflow®, SimEvents®, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

A further alternative embodiment may be implemented in a language that is compatible with a product that includes a TCE, such as one or more of the above identified text-based or graphically-based TCEs. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to perform model checking.

Yet another alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards, etc.).

As shown in FIG. 3, modeling environment 108 may include a simulation tool 310, an entity library 320, an interface logic 330, a compiler 340, a controller logic 350, an optimizer 360, a simulation engine 370, a report engine 380, and a code generator 390.

Simulation tool 310 may include an application for building a model. Simulation tool 310 may be used to build a textual model or a graphical model having executable semantics. In the case of graphical models, simulation tool 310 may allow users to create, display, modify, diagnose, annotate, delete, print, etc., model entities and/or connections. Simulation tool 310 may interact with other entities illustrated in FIG. 3 for receiving user inputs, executing a model, displaying results, generating code, etc. Simulation tool 310 may provide a user with an editor for constructing or interacting with textual models and/or a GUI for creating or interacting with graphical models. The editor may be configured to allow a user to, for example, specify, edit, annotate, save, print, and/or publish a model. A textual interface may be provided to permit interaction with the editor. A user may write scripts that perform automatic editing operations on a model using the textual interface. For example, the textual interface may provide a set of windows that may act as a canvas for the model, and may permit user interaction with the model. A model may include one or more windows, for example, depending on whether the model is partitioned into multiple hierarchical levels.

Entity library 320 may include code modules or entities (e.g., blocks/icons) that a user can drag and drop into a display window that includes a graphical model. In the case of graphical models, a user may further couple entities using connections to produce a graphical model of a system, such as target environment 110.

Interface logic 330 may allow modeling environment 108 to send or receive data and/or information to/from devices (e.g., target environment 110, processing cluster 130, etc.) or software modules (e.g., a function, an application program interface, etc.).

Compiler 340 may compile a model into an executable format. Code generator 390 may generate executable code for a part or all of a graphical model. The generated executable code produced by code generator 390 may be executed on computer device 400 to produce a modeling result. In an embodiment, compiler 340 may also provide debugging capabilities for diagnosing errors associated with the model. Code generator 390 may generate executable code for a part of a graphical model. The executable code may then be automatically executed during execution of the model, so that a first part of the model executes as an interpreted execution and a second part of the model executes as a compiled execution. Compiler 340 may further perform operations such as propagating data types, sample times, determining an order for block execution, creating a static execution schedule, etc.

Controller logic 350 may be used to create and implement controllers in a graphical model. For example, controller logic 350 may provide functionality for entities that represent types of controllers in the graphical model. When the graphical model executes, controller logic 350 may perform control operations on the model by interacting with entities in the graphical model. In an embodiment, controller logic 350 may include control algorithms that implement controllers in the graphical model, such as, for example, 'proportional-integral-derivative' (PID) controls, gain scheduling controls, H-infinity controls, model predictive controls (MPC), dynamic inversion controls, bang/bang controls, sliding mode controls, deadbeat controls, and/or other another type of controls. Embodiments of controller logic 350 may be configured to operate in standalone or distributed implementations.

Optimizer 360 may optimize code, parameters, performance (e.g., execution speed, memory usage), etc., for a model. For example, optimizer 360 may optimize code to cause the code to occupy less memory, to cause the code to execute more efficiently, to cause the code to execute faster, etc., than the code would execute if the code were not optimized. Optimizer 360 may also perform optimizations for controller logic 350, e.g., to optimize parameters for a controller. In an embodiment, optimizer 360 may operate with or may be integrated into compiler 340, controller logic 350, code generator 390, etc. Embodiments of optimizer 360 may be implemented via software objects that interact with other object-oriented software, e.g., for receiving data on which optimizer 360 operates.

Simulation engine 370 may perform operations for executing a model to simulate a system. Executing a model to simulate a system may be referred to as simulating a model. Simulation engine 370 may be configured to perform standalone or remote simulations based on user preferences or system preferences.

Nonlinear programming solver 375 may solve a nonlinear programming problem defined by a simulation engine 370. A solution determined by nonlinear programming solver 375 may be used by simulation engine 370 to execute the model.

Report engine 380 may produce a report based on information in modeling environment 108. For example, report engine 380 may produce a report indicating whether a controller satisfies design specifications, a report indicating whether a controller operates in a stable manner, a report indicating whether a model compiles properly, etc. Embodiments of report engine 380 can produce reports in an electronic format for display on output device 470, in a hardcopy format, and/or a format adapted for storage in storage device 430/450.

Code generator 390 may generate code from a model. In an embodiment, code generator 390 may be configured to compile and link the generated code to produce an "in-memory executable" version of a model. The in-memory executable version of model may be used, for example, to simulate, verify, trim, and/or linearize the model. In an embodiment, code generator 390 may receive code in a first format and may transform the code from the first format into a second format. In an embodiment, code generator 390 can generate source code, assembly language code, binary code, interface information, configuration information, performance information, task information, etc., from at least a portion of a model. For example, code generator 390 can generate C, C++, SystemC, Java, Structured Text, etc., code from the model.

Embodiments of code generator 390 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Architecture Analysis and Design Language (AADL), Hardware Description Language (HDL), Automotive Open System Architecture (AUTOSAR), etc.). In an embodiment, optimizer 360 can interact with code generator 390 to generate code that is optimized according to a parameter (e.g., memory use, execution speed, multi-processing, etc.). Embodiments of modeling environments consistent with principles of the invention can further include components such as verification components, validation components, etc.

Although FIG. 3 shows exemplary components of modeling environment 108, in other implementations, modeling environment 108 may include fewer components, different components, differently arranged components, or additional components than depicted in FIG. 3. Additionally or alternatively, one or more components of modeling environment 108 may perform one or more tasks described as being performed by one or more other components of modeling environment 108.

Figure 4:
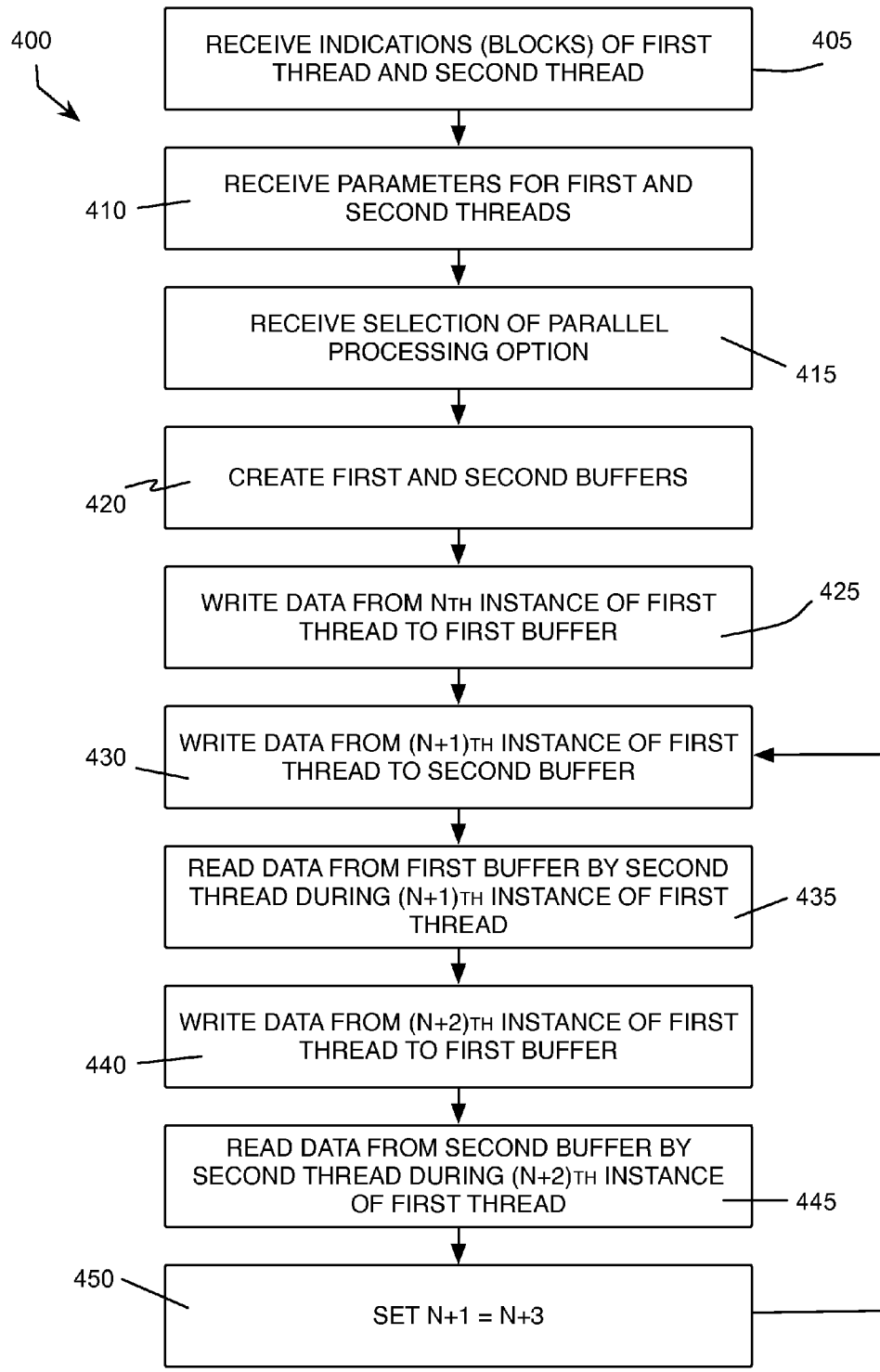
FIG. 4 is a flowchart of an exemplary process for simulating a dynamic system that includes at least two concurrently executing processing threads.
Figure 5:
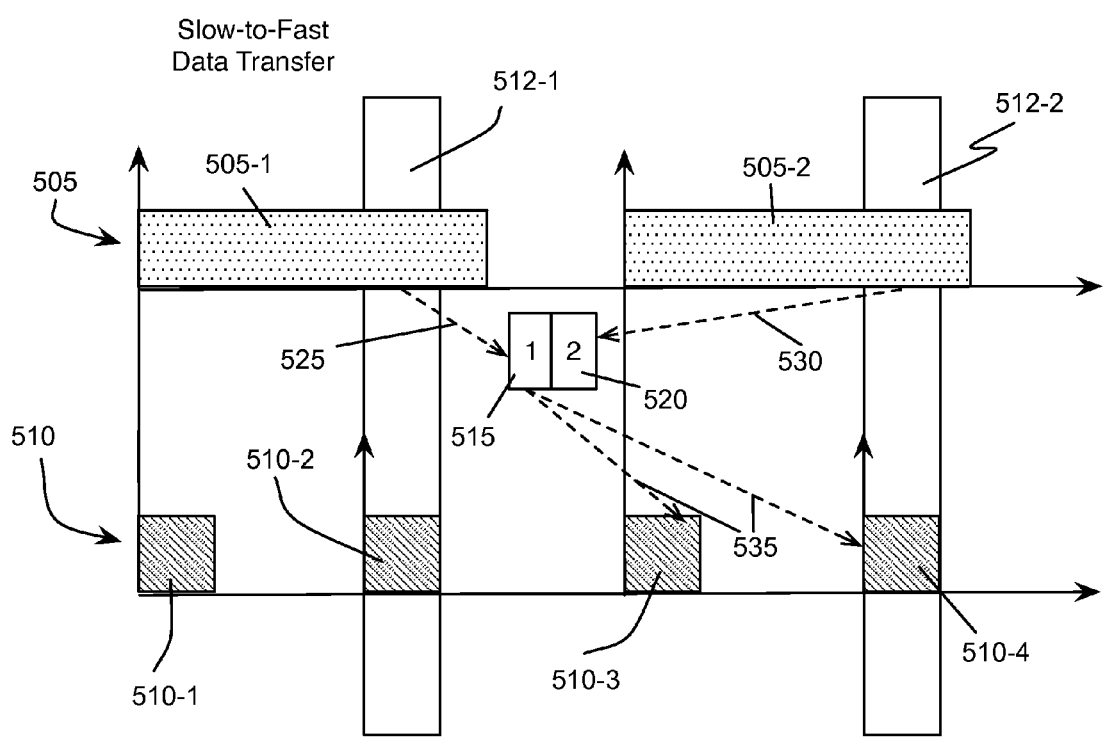
FIG. 5 is diagram that depicts an implementation for handling parallel tasks without data corruption in a slow-to-fast embodiment consistent with the process of FIG. 4.

FIG. 4 is a flowchart of an exemplary process 400 for simulating a dynamic system that includes at least two concurrently executing processing threads. In one implementation, the process exemplified by FIG. 4 may be implemented by processing logic 220 of computer device 105, described above, in the course of executing modeling environment 108. FIG. 5 is a diagram that depicts an implementation for handling parallel tasks without data corruption in a slow-to-fast embodiment consistent with process 400. Process 400 will be described in conjunction with FIG. 5.

Process 400 may begin upon receipt of indications of a first thread 505 and a second thread 510 (block 405). For example, one or more blocks may be received within modeling environment 108 that define first thread 505 and second thread 510. For example, a user may, within modeling environment 108, input (e.g., drag/drop) blocks relating to first thread 505 and second thread 510 into a user interface associated with modeling environment 108.

Next, modeling environment 108 may receive parameters for first thread 505 and second thread 510 (block 410). For example, modeling environment 108 may receive an indication of (1) a triggering event 512 associated with first thread 505 for causing first thread 505 to output data, (2) a first periodicity value associated with first thread 505, and (3) a second periodicity value associated with second thread 510. In some implementations, these parameters may be received from the user of modeling environment 108 via options dialogs associated with the respective thread identifying blocks. Exemplary triggering events 512 may include time interval expiration, output from other blocks/processes, etc.

Consistent with implementations described herein and as depicted in FIG. 5, first and second threads 505/510 may be based on a common time base and may execute at integer intervals of each other. That is, the first periodicity value is an integer (or inverse integer) multiple of the second periodicity value. For example, the first periodicity value of first thread 505 may be defined as 0.4 (e.g., thread 505 executes every 0.4 seconds) and the second periodicity value of second thread 510 may be defined as 0.2 (e.g., thread 510 executes every 0.2 seconds). By sharing a common time base, it can be known that thread 510 executes exactly twice for each execution of thread 505, in this example. Next, modeling environment 108 receives a parallel processing option selection for each of threads 505 and 510 (block 415). For example, as with the thread-defining parameters described above, the parallel processing option may be selected in the options dialogs associated with the respective thread identifying blocks and may cause modeling environment to simulate parallel processing of threads 505/510 when the model is executed. More specifically, in one embodiment, selection of the parallel processing option may be received in a portion of the options dialogs corresponding to execution of solver 375 for the particular block. Selection of this option causes solver 375 to perform the processing described below and further causes code generator 390 to output code capable of executing in a multi-core target environment.

Next, consistent with embodiments described herein, during simulation of the model that includes threads 505/510, modeling environment 108 (e.g., solver 375) may create, within the executable graphical model, a first buffer 515 and a second buffer 520 (block 420). For example, solver 375 may create simulated buffers 515 to which data may be stored from, e.g., thread 505. Moreover, code generator 390 may, during generation of the code corresponding to the graphical model, output code that causes an executing computer system to create and define suitable buffers from available memory. In some embodiments, solver 375 may be configured to define parameters (e.g., buffer sizes, etc.) of buffers 515 and 520 based on characteristics of the graphical model.

515 and a second buffer 520 (block 420). For example, solver 375 may create simulated buffers 515 to which data may be stored from, e.g., thread 505. Moreover, code generator 390 may, during generation of the code corresponding to the graphical model, output code that causes an executing computer system to create and define suitable buffers from available memory. In some embodiments, solver 375 may be configured to define parameters (e.g., buffer sizes, etc.) of buffers 515 and 520 based on characteristics of the graphical model.

Next, modeling environment 108 (e.g., solver 375) may be configured to cause first thread 505 to write data to first buffer 515 during an Nth execution instance of first thread 505, where N is any integer (block 425). For example, as shown in FIG. 5, during simulation of the graphical model, solver 375 may cause thread 505 to output data to first buffer 515 (e.g., in response to triggering event 512-1) during the first depicted instance (e.g., instance 505-1) of first thread 505. This action is depicted by the dashed line labeled 525 in FIG. 5.

Next, modeling environment 108 (e.g., solver 375) may be configured to cause first thread 505 to write data to second buffer 520 during a (N+1)th execution instance of first thread 505, e.g., during a next execution instance of first thread 505 (block 430). For example, as shown in FIG. 5, during simulation of the graphical model, solver 375 may cause thread 505 to output data to second buffer 520 (e.g., in response to triggering event 512-2) during the second execution instance 505-2 of thread 505. This action is depicted by the dashed line labeled 530 in FIG. 5.

Consistent with embodiments described herein, modeling environment 108 (e.g., solver 375) may cause second thread 510 to read data from first buffer 515 during execution instances of second thread 510 that occur after completion of the Nth execution instance of first thread 505, but prior to completion of the (N+1)th instance of first thread 505 (block 435). For example, as shown in FIG. 5, during simulation of the graphical model, solver 375 may cause second thread 510 to read data from first buffer 515 at instances 510-3 (e.g., the Mth instance of thread 510) and 510-4 (e.g., the (M+1)th instance of thread 510), both of which occur after instance 505-1 of first thread 505 and prior to the completion of (e.g., contemporaneously with) instance 505-2 of first thread 505. These actions are depicted by the dashed lines labeled 535 in FIG. 5.

In one implementation, instances of second thread 510 that occur prior to completion of instance 505-1 of first thread 505 (e.g., instances 510-1 (the (M−2)th instance of thread 505) and 510-2 (the M−1)th instance of thread 505) in FIG. 5) are executed using initial conditions or default data associated with thread 510, since no output from thread 505 is ready for utilization by thread 510. In other embodiments, these instances of second thread 510 may be configured to obtain data from other sources, may predict data, etc.

Processing continues for a next instance (e.g., an (N+2)th instance) of first thread 505 by again outputting data from first thread 505 to first buffer 515 (block 440). For example, assuming that the example depicted in FIG. 5 were to continue with a third instance of thread 505 following instances 505-1 and 505-2, data from the third instance would be output to first buffer 515. Similarly, any instances of second thread 510 that occur following completion of the (N+1)th instance, e.g., instance 505-2, of first thread 505, but prior to the completion of the (N+2)th instance of first thread 505 would read data from second buffer 520 (block 445).

Processing may then continue by setting N+1=N+3 (block 450) and returning to block 430. This effectively toggles output of instances of first thread 505 back and forth between first buffer 515 and second buffer 520, while causing instances of second thread 510 that execute contemporaneously with an instance of first thread 505 to read data from an opposite buffer.

Consistent with embodiments described herein, outputting to and reading from first and second buffers 515 and 520 may be performed by manipulating memory pointers, flags, or addresses. In this manner, to cause first thread 505 to change output from first buffer 515 to second buffer 520, a memory pointer (flag, address, etc.) corresponding to the appropriate buffer is configured by modeling environment 108.

By way of example, assume that a first pointer is associated with first buffer 515 and a second pointer is associated with second buffer 520. During the Nth instance of first thread 505, solver 375 may associate the first pointer with first thread 505, thereby causing data output by the Nth instance of first thread 505 to be output to first buffer 515. Similarly, during the (N+1)th instance (e.g., the next instance) of first thread 505, described above, solver 375 may associate the second pointer with first thread 505, thereby causing data output by the (N+1)th instance of first thread 505 to be output to second buffer 520.

From a read perspective, the process is opposite. That is, during the (N+1)th instance of first thread 505, solver 375 may associate the first pointer with second thread 510, thereby causing any instances of second thread 510 that occur during the (N+1)th instance of first thread 505 (e.g., the Mth instance 510-3 and the (M+1)th instance 510-4) to read data from first buffer 515.

In this manner, determinations regarding access to buffers 515 and 520 are self-contained within each thread 505/510 and buffer access for each thread 505/510 may be statically scheduled a priori by compiler 340 before code corresponding to the model is generated by code generator 390. That is, the pointers for accessing respective buffers are self-contained within the threads and changed based on a known, and statically scheduled, shared time interval between the threads.

Figure 6:
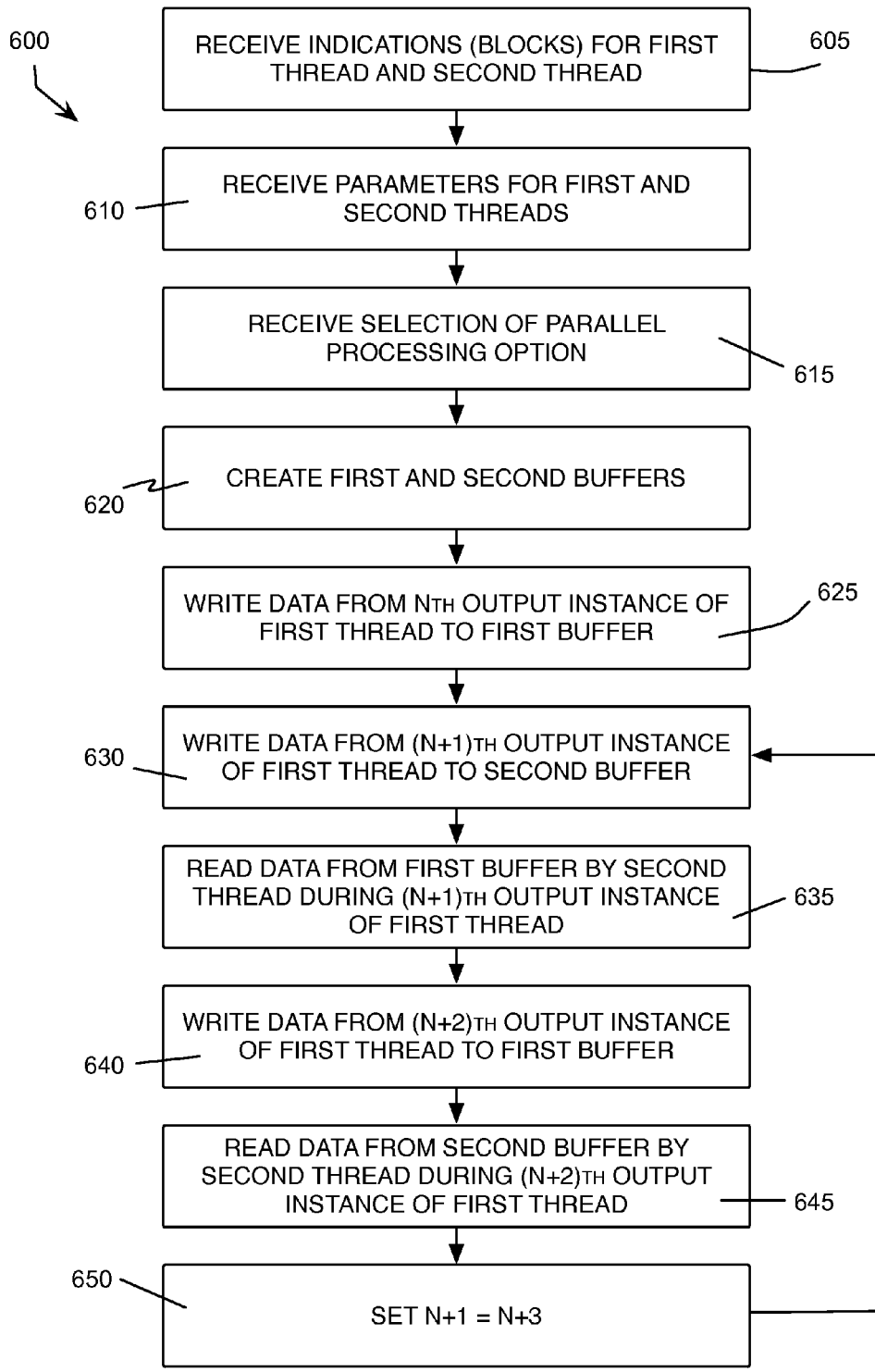
FIG. 6 is a flowchart of another exemplary process for simulating a dynamic system that includes at least two concurrently executing processing threads.
Figure 7:
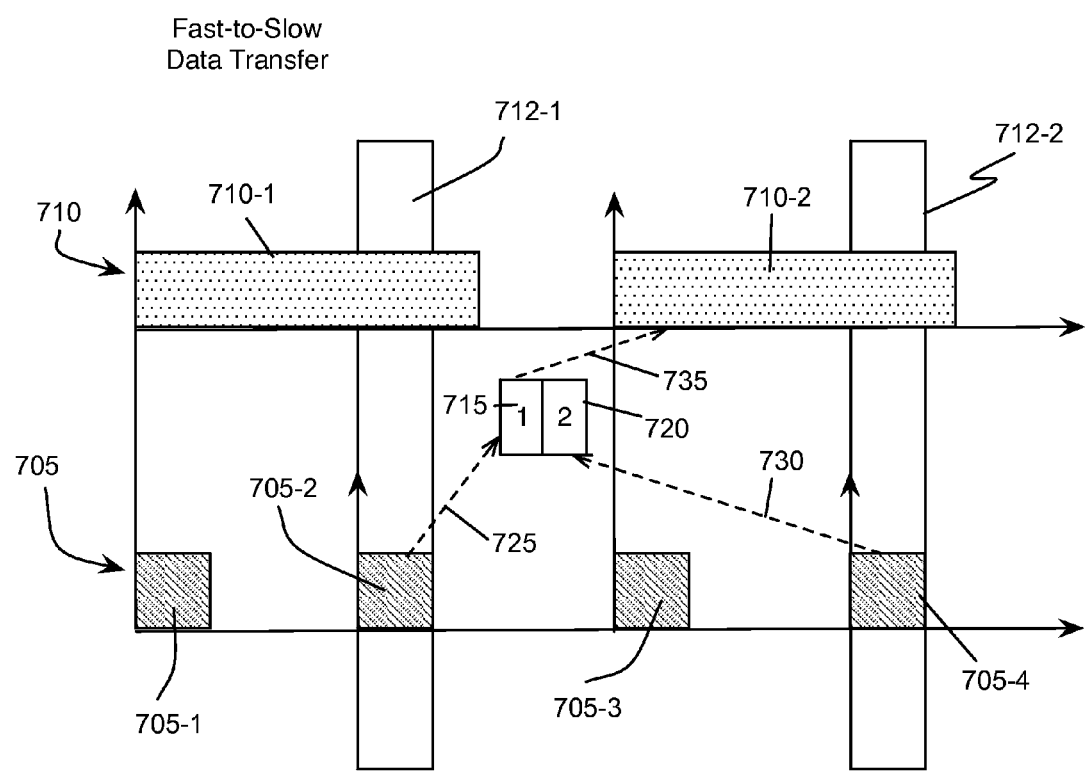
FIG. 7 is diagram that depicts an implementation for handling parallel tasks without data corruption in a fast-to-slow embodiment consistent with the process of FIG. 6.

FIG. 6 is a flowchart of another exemplary process 600 for simulating a dynamic system that includes at least two concurrently executing processing threads. In one implementation, the process exemplified by FIG. 6 may be implemented by processing logic 420 of computer device 105, described above, in the course of executing modeling environment 108. FIG. 7 is diagram that depicts an implementation for handling parallel tasks without data corruption in a fast-to-slow embodiment consistent with process 600. Process 600 will be described in conjunction with FIG. 7.

Similar to process 400 described above, process 600 may begin upon receipt of one or more blocks modeling environment 108 that define a first thread 705 (e.g., a "fast" thread) and a second thread 710 (e.g., a "slow" thread) (block 605). For example, a user may, within modeling environment 108, input (e.g., drag/drop) blocks relating to first thread 705 and second thread 710 into a user interface associated with modeling environment 108.

Next, modeling environment 108 may receive parameters for first thread 705 and second thread 710 (block 610). For example, modeling environment 108 may receive an indication of (1) a triggering event 712 associated with first thread 705 for causing first thread 705 to output data, (2) a first periodicity value associated with first thread 705, and (3) a second periodicity value associated with second thread 710. Exemplary triggering events 712 may include time interval expiration, output from other blocks/processes, etc.

Consistent with implementations described herein and as depicted in FIG. 7, first and second threads 705/710 may be based on a common time base and may execute at integer intervals of each other. That is, the first periodicity value is an integer (or inverse integer) multiple of the second periodicity value. For example, the first periodicity value of first thread 705 may be defined as 0.2 (e.g., thread 705 executes every 0.2 seconds) and the second periodicity value of second thread 710 may be defined as 0.4 (e.g., thread 710 executes every 0.4 seconds). By sharing a common time base, it can be known that thread 705 executes exactly twice for each execution of thread 710, in this example.

Next, modeling environment 108 receives a parallel processing option selection for each of threads 705 and 710 (block 615). For example, as with the thread-defining parameters described above, the parallel processing option may be selected in the options dialogs associated with the respective thread identifying blocks and may cause modeling environment to simulate parallel processing of threads 705/710 when the model is executed. More specifically, in one embodiment, selection of the parallel processing option may be received in a portion of the options dialog corresponding to execution of solver 375 for the particular block. Selection of this option causes solver 375 to perform the processing described below and further causes code generator 390 to output code capable of executing in a multi-core target environment.

Next, consistent with embodiments described herein, during simulation of the model that includes threads 705/710, modeling environment 108 (e.g., solver 375) may create a first buffer 715 and a second buffer 720 within modeling environment 108 (block 620). For example, solver 375 may create simulated buffers 715/720 to which data may be output to, e.g., by thread 705. Moreover, code generator 390 may, during generation of the code corresponding to the graphical model, output code that causes an executing computer system to create and define suitable buffers from available memory. In some embodiments, solver 375 may be configured to define parameters (e.g., buffer sizes, etc.) of buffers 715 and 720 based on other characteristics of the graphical model.

Next, modeling environment 108 (e.g., solver 375) may be configured to cause first thread 705 to write data to first buffer 715 during an Nth output instance of first thread 705, where N is any integer (block 625). For example, as shown in FIG. 7, during simulation of the graphical model, solver 375 may cause instance 705-2 of thread 705 to output data to first buffer 715 in response to triggering event 712-1. This action is depicted by the dashed line labeled 725 in FIG. 7.

Next, modeling environment 108 (e.g., solver 375) may be configured to cause first thread 705 to write data to second buffer 720 during a (N+1)th output instance of first thread 705, e.g., during a next instance of first thread 705 corresponding to a triggering event (block 630). For example, as shown in FIG. 7, during simulation of the graphical model, solver 375 may cause thread 705 to output data to second buffer 720 in response to triggering event 712-2 during the fourth execution instance 705-4 of thread 705. This action is depicted by the dashed line labeled 730 in FIG. 7.

Consistent with embodiments described herein, modeling environment 108 (e.g., solver 375) may cause second thread 710 to read data from first buffer 715 during execution instances of second thread 710 that occurs after completion of the Nth output instance of first thread 705, but prior to completion of the (N+1)th output instance of first thread 705 (block 635). For example, as shown in FIG. 7, during simulation of the graphical model, solver 375 may cause thread 710 to read data from first buffer 715 at instance 710-2 (e.g., the (M+1)th instance) of thread 710, which occurs after instance 705-2 (e.g., the Nth output instance) of first thread 705 and prior to the completion of (e.g., contemporaneously with) output instance 705-4 (e.g., the (N+1)th output instance) of first thread 705. This action is depicted by the dashed line labeled 735 in FIG. 7.

In one implementation, any instances of second thread 710 that occur prior to completion of instance 705-2 of first thread 705 (e.g., instance 710-1 (the Mth instance of thread 710) in FIG. 6) are executed using initial conditions or default data associated with thread 710, since no output from thread 705 is ready for utilization. In other embodiments, these instances of second thread 710 may be configured to obtain data from other sources, may predict data, etc.

Processing continues for a next output instance (e.g., an (N+2)th output instance) of first thread 705 by outputting data from first thread 705 to first buffer 715 (block 640). For example, assuming that the example depicted in FIG. 7 were to continue with fifth and sixth instances of thread 705 following instances 505-3 and 505-4, and a third triggering event 512 occurring during the sixth instance of thread 705, data from the third output instance (e.g., the sixth total instance of thread 705) would be output to first buffer 715. Similarly, any instances of second thread 710 (e.g., an (M+2)th instance of thread 710) that occur following completion of the (N+1)th output instance, e.g., instance 705-4, of first thread 705, but prior to the completion of the (N+2)th instance of first thread 705 would read data from second buffer 720 (block 645)

Processing may then continue by setting N+1=N+3 (block 650) and returning to block 630. This effectively toggles the data output of output instances of first thread 705 (corresponding to triggering events 712) back and forth between first buffer 715 and second buffer 720, while causing instances of second thread 710 that execute contemporaneously with an output instance of first thread 705 to read data from an opposite buffer.

Consistent with implementations described herein, both slow-to-fast and fast-to-slow rate transition behaviors can be summarized as follow: Rate Transition Block=1/z (delay unit block) (@inputTs)+zero-order hold block (ZOH) (@outputTs); fast-to-slow: 1/z(@fastRate)+ZOH(@slowRate); and slow-to-fast: 1/z (@slowRate)+ZOH(@fastRate).

As described above, such a buffering scheme shares data from the previous cycle of the input rate task. This removes data dependency and decouples the two threads or tasks. When either thread or task is scheduled to run, it can run at a determined speed (e.g., a full speed, maximum speed, etc.) without blocking or waiting. For zero order hold (ZOH) data output, the value of the output buffer may be held, thereby ensuring that data doesn't change during the output task execution period.

Embodiments assume that periodic rate tasks share common clock, that there is no drift between rates of the clock, that periodic rates of the clock are related by a multiple integer with zero offset, and modeling environment 108 ensures that periodic rates do not run over deadlines. In one implementation, modeling environment 108 includes a scheduler component that regulates the rate of execution of threads, such as threads 505/705 and 510/710.

Both the fast-to-slow and slow-to-fast implementations ensure that simulation and generated code results match. In addition, behavior is deterministic regardless the execution order of tasks invoked and the algorithms ensure full parallelism without semaphore blocking. Algorithms are target independent and have ANSI C implementation.

Although the embodiments described above specifically reference scenarios in which two threads (or tasks) are configured to execute concurrently on multiple processors in a parallel manner based on periodic time-based execution, other multi-core embodiments may be similarly supported. For example, multiple concurrent reading threads may be supported in the manner described above.

For example, rather than including a single reading thread (e.g., thread 410 in FIG. 4), the graphical model may include three such threads. Consistent with aspects described herein, each of the concurrent reading threads may be configured to utilize a same buffer pointer. For example, if a first reading thread is reading from the first buffer, each of the second and third reading threads may be similarly configured to read from the same buffer. Accordingly, when the first reading thread reads from the second buffer, each of the second and third reading threads may be similarly configured to read from the second buffer.

In another alternative implementation, the parallel threads (e.g., threads 505 and 510) may be configured to execute at periodicities which are not integer multiples of each other. In such an implementation, the modeling environment may be configured to determine the lowest common multiple (LCM) of the respective thread periodicities and index the respective buffers based on the determined LCM. LCM periodicity may also be referred to as a hyperperiod.

For example, assume a first thread having a periodicity of 0.5 s and a second thread having a periodicity of 0.3 s. In this example, the LCM of the respective thread periodicities is 1.5 s. Accordingly, consistent with embodiments described above, the modeling environment may be configured to write data from the first thread to the first buffer at every output instance in the first LCM period (e.g., 0-1.5 s). Similarly, from 1.5 s to 3.0 s (e.g., the second LCM period), the first thread may be configured to output data to the second buffer.

On the read side, during the first LCM period (e.g., 0-1.5 s), the second thread may be configured to use the original configuration data and for the second LCM period (e.g., 1.5-3.0 s), the second thread may be configured to read data from the first buffer. Essentially, rather than alternate thread output based on the periodicity of the writing thread, buffer output may be based on the LCM of the writing and reading thread periodicities.

In still another implementation, multiple reading threads, each having a same or different periodicity may also be supported, including periodicities which are not integer multiples of each other. In such an implementation, the modeling environment may be configured to determine the lowest common multiple (LCM) of the respective writing and reading thread periodicities and index the respective buffers based on the determined LCM.

For example, assume a writing thread having a periodicity of 0.5 s, a first reading thread having a periodicity of 0.3 s, a second reading thread having a periodicity of 0.1 s, and a third reading thread having a periodicity of 0.7 s. In this example, the LCM of the respective thread periodicities (e.g., the 0.5 s thread, the 0.3 s thread, the 0.1 s thread, and the 0.7 s thread) is 10.5 s. Accordingly, consistent with embodiments described above, the modeling environment may be configured to write data from the writing thread to the first buffer at every output instance in the first LCM period (e.g., 0-10.5 s). Similarly, from 10.5 s to 21.0 s (e.g., the second LCM period), the writing thread may be configured to output data to the second buffer.

On the read side, during the first LCM period (e.g., 0-10.5 s), each of the first, second, and third reading threads may be configured to use the original configuration data and for the second LCM period (e.g., 10.5-21.0 s), the first, second, and third reading threads may be configured to read data from the first buffer. Essentially, rather than alternate thread output based on the periodicity of the writing thread, buffer output may be based on the LCM of all of the writing and reading thread periodicities.

In this example, the LCM periodicity for the various writing and reading threads is 1.2 s. Accordingly, during the first LCM period (e.g., 0-1.2 s), the first writing thread writes to slot 1 in the circular buffer and the second writing thread writes to slot 2 in the circular buffer. The reading threads read from slot 0 in the circular buffer. During the second LCM period (e.g., 1.2-2.4 s), the buffer indexes for all threads are advanced. Accordingly, during the second LCM period, the first writing thread writes to slot 2, the second writing thread writes to slot 0, and the reading threads read from slot 1.

The foregoing description of embodiments is intended to provide illustration and description, but is not intended to be exhaustive or to limit the invention to the precise form disclosed. Modifications and variations are possible in light of the above teachings or may be acquired from practice of the invention.

Also, the term "user", as used herein, is intended to be broadly interpreted to include, for example, a computing device (e.g., a workstation) or a user of a computing device, unless otherwise stated.

It will be apparent that embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more computer-readable storage media and may include computer-executable instructions for execution by processing logic, such as processing logic 120. The computer-executable instructions may be configured to implement one or more embodiments of the invention. The computer-readable storage media may be volatile or non-volatile and may include, for example, flash memories, removable disks, non-removable disks, and so on.

In addition, it should be noted that various electromagnetic signals, such as wireless signals, electrical signals carried over a wire, optical signals carried over optical fiber, etc., may be encoded to carry data and/or computer-executable instructions, configured to implement one or more embodiments of the invention, on, for example, a communication network, such as network 140.

No element, act, or instruction used herein should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computing device, in a technical computing environment, comprising:
    a memory to store executable instructions to implement an executable graphical model of a dynamic system; and
    a processor configured to:
        receive an indication of a first set of operations, wherein the first set of operations:
            outputs data upon occurrence of a triggering event, and has a first periodicity value;
        receive an indication of a second set of operations, wherein the second set of operations:
            executes concurrently with the first set of operations,
            reads the data output by the first set of operations, and has a second periodicity value,
        wherein:
            the second periodicity value of the second set of operations is an integer or inverse integer multiple of the first periodicity value of the first set of operations, and
            execution of instances of the first set of operations and the second set of operations share a common time base;
        create, within the executable graphical model, a first buffer and a second buffer;
        configure the first set of operations to write the data to the first buffer during a first execution instance of the first set of operations;
        configure the first set of operations to write the data to the second buffer during a second execution instance of the first set of operations; and
        configure the second set of operations to read the data from the first buffer during an execution instance of the second set of operations, the execution instance of the second set of operations executing contemporaneously with the second execution instance of the first set of operations,
        wherein determinations regarding access to the first buffer and second buffer by the first set of operations are self-contained within the first set of operations, and
        wherein determinations regarding access to the first buffer and the second buffer by the second set of operations are self-contained within the second set of operations.

2. The computing device of claim 1, wherein the processor is further configured to:
    receive the indications of the first set of operations and the second set of operations and the first periodicity value of the first set of operations and the second periodicity value of the second set of operations from an input device, and
    create the first buffer and the second buffer in a solver configured to execute the graphical model.

3. The computing device of claim 2, wherein the processor is further configured to:
    execute a deterministic simulation of the executable graphical model in the solver.

4. The computing device of claim 2, wherein the processor is further configured to:
    generate executable code based on the executable graphical model.

5. The computing device of claim 1, wherein the triggering event, the first periodicity value, and the second periodicity value are inferred from executable graphical model.

6. The computing device of claim 1, wherein the first buffer and the second buffer comprise a circular buffer having at least two slots.

7. The computing device of claim 1, wherein the processor is further configured to:
    configure the first set of operations to write the data to the first buffer during an Nth execution instance that occurs following completion an (N−1)th execution instance of the first set of operations; and
    configure the second set of operations to read the data from the second buffer during an Mth execution instance executing contemporaneously with the Nth execution instance of the first set of operations,
    wherein the Mth execution instance of the second set of operations occurs following completion of the (N−1)th execution instance of the first set of operations;

configure the first set of operations to write the data to the second buffer during a (N+1)th execution instance following the Nth execution instance; and configure the second set of operations to read the data from the first buffer during a (M+1)th execution instance executing contemporaneously with the (N+1)th execution instance of the first set of operations, wherein the (M+1)th execution instance of the second set of operations occurs following completion of the Nth execution instance of the first set of operations.

8. The computing device of claim 1, wherein the processor is further configured to:

associate a first pointer with the first set of operations, and a second pointer with the second set of operations;

assign the first pointer to the first buffer during the first execution instance of the first set of operations; and configure the first set of operations to write the data to the first buffer based on the assignment of the first pointer to the first buffer;

assign the second pointer to the second buffer during the first execution instance of the first set of operations; and configure the second set of operations to read the data from the second buffer based on the assignment of the second pointer to the second buffer.

9. The computing device of claim 1, wherein the second set of operations is configured to read the data from the first buffer multiple times during the second execution instance of the first set of operations.

10. The computing device of claim 1, wherein the first set of operations is executing on a first core or processor and the second set of operations is executing on a second core or processor.

11. The computing device of claim 1, wherein scheduling of the accesses to the first and second buffers by the first set of operations is statically scheduled during simulation of the executable graphical model, and wherein scheduling of accesses to the first and second buffers by the second set of operations is statically scheduled during simulation of the executable graphical model.

12. The computing device of claim 1, wherein the first and second sets of operations comprise tasks, threads or processes.

13. A computing-device implemented method, comprising:

simulating an executable model, wherein the simulating comprises:

executing, by the executable model, a first instance of a first set of operations;

writing data, by the first instance of the first set of operations, to a first buffer in the executable model;

executing, by the executable model, a next time instance of the first set of operations;

writing data, by the next time instance of the first set of operations, to a second buffer in the executable model;

executing, by the executable model, a first instance of a second set of operations after completion of the first instance of the first set of operations and before completion of the next time instance of the first set of operations, wherein the first set of operations and the second set of operations share a common time base; and reading data, by the first instance of the second set of operations, from the first buffer.

14. The method of claim 13, wherein the first set of operations and the second set of operations each comprise periodically executing set of operations.

15. The method of claim 14, wherein a period of execution of the first set of operations is different than a period of execution of the second set of operations.

16. The method of claim 14, wherein the simulated execution of the first set of operations and the simulated execution of the second set of operations are synchronized, such that the instances of each of the first and second set of operations are periodically executed simultaneously.

17. The method of claim 14, wherein an executing time relationship between the first set of operations and the second set of operations comprises an integer multiple.

18. The method of claim 14, wherein an executing time relationship between the first set of operations and the second set of operations comprises an non-integer multiple, the simulating further comprising:

determining a lowest common multiple (LCM) periodicity based on a periodicity of the first set of operations and a periodicity of the second set of operations;

writing the data from the first set of operations to the first buffer, during instances occurring in a first LCM period corresponding to the LCM periodicity;

writing the data from the first set of operations to the second buffer, during instances occurring in a second LCM period corresponding to the LCM periodicity; and reading the data from the first buffer by instances of the second set of operations occurring in the second LCM period corresponding to the LCM periodicity.

19. The method of claim 13, further comprising:

executing, by the executable model, a next time instance of the second set of operations contemporaneously with the next time instance of the first set of operations; and reading data, by the next time instance of the second set of operations, from the first buffer.

20. The method of claim 19, further comprising:

executing, by the executable model, an Nth instance of the first set of operations, wherein the Nth instance occurs following completion of the next time instance of the first set of operations;

writing data, by the Nth instance of the first set of operations, to the first buffer;

executing, by the executable model, an Mth instance of the second set of operations contemporaneously with the Nth instance of the first set of operations, wherein the Mth instance occurs following completion of the next time instance of the second set of operations; and reading data, by the Mth instance of the second set of operations, from the second buffer.

21. The method of claim 13, wherein second set of operations comprises multiple reading set of operations.

22. The method of claim 13, wherein the first set of operations is executing on a first core or processor in the executable model and the second set of operations is executing on the first core or processor in the executable model.

23. The method of claim 13, wherein the first buffer and the second buffer in the executable model include memory spaces identified by a first flag associated with the first set of operations and a second flag associated with the second set of operations, wherein an association of the first flag with the first buffer or the second buffer during the simulating indicates whether the first set of operations is writing to the first buffer or second buffer, respectively, and wherein an association of the second flag with the first buffer or the second buffer during the simulating indicates whether the second set of operations is reading from the first buffer or second buffer, respectively.

24. The method of claim 23, further comprising:
assigning, by the executable model, the first flag to the first buffer during the first instance of the first set of operations;
writing to the first buffer by the first instance of the first set of operations based on the assigning of the first flag to the first buffer; and
assigning, by the executable model, the second flag to the first buffer at a beginning of a next time instance of the first set of operations; and
reading from the first buffer by the first instance of the second set of operations based on the assigning of the second flag to the first buffer.

25. The method of claim 24, further comprising:
defining, within the executable model, a periodicity of execution of the instances of the first set of operations; and
performing the assigning of the second flag during the simulating based on the periodicity of execution of the instances of the first set of operations.

26. The method of claim 13, further comprising:
identifying, by the executable model, an occurrence of a triggering event during execution of the first instance of the first set of operations; and
writing data, by the first instance of the first set of operations, to the first buffer upon identification of the triggering event.

27. The method of claim 26, wherein occurrence of a triggering event does not occur during each execution of the first set of operations.

28. The method of claim 13, wherein the second buffer in the executable model includes initial condition data prior to writing to the second buffer by the later instance of the first set of operations,
wherein, during an instance of the second set of operations executing during execution of the first instance of the first set of operations, the initial condition data is read from the second buffer.

29. The method of claim 13, wherein the simulating further comprises:
generating executable code based on the executable model.

30. A non-transitory computer-readable medium containing instructions executable by at least one processor, for causing the at least one processor to:
configure a second buffer to include initial data; execute an Nth instance of a first set of operations; write data, by the Nth instance of the first set of operations, to a first buffer;
execute a Mth instance of a second thread contemporaneously with the Nth instance of the first set of operations, wherein the instances of the first set of operations and the second thread execute based on a shared time base;
read the initial data, by the Mth instance of a second set of operations, from the second buffer;
execute an (N+1)th instance of the first set of operations following completion of the Nth instance of the first set of operations;
write data, by the (N+1)th instance of the first set of operations, to the second buffer; execute a Kth instance of the second set of operations contemporaneously with the (N+1)th instance of the first set of operations, wherein the Kth instance of a second set of operations occurs subsequent to the Mth instance of the second set of operations; and
read data, by the Kth instance of the second set of operations, from the first buffer.

31. A non-transitory computer-readable medium containing instructions executable by at least one processor, for causing the at least one processor to:
configure a second buffer to include initial data;
execute a first set of instances of a first set of operations;
write data, by the first set of instances of the first set of operations, to a first buffer;
execute a second set of instances of a first set of operations;
write data, by the second set of instances of the first set of operations, to a second buffer;
execute a first instance of a second set of operations contemporaneously with the execution of the first set of instances of the first set of operations;
read the initial data, by the first instance of a second set of operations, from the second buffer;
execute a second instance of the second set of operations contemporaneously with the execution of the second set of instances of the first set of operations; and
read the data, by the second instance of the second set of operations, from the first buffer.

* * * * *